US005521466A

United States Patent [19]
Vincent

[11] Patent Number: 5,521,466
[45] Date of Patent: May 28, 1996

[54] MULTIPLEXED TRAILER LIGHT SYSTEM

[75] Inventor: Raymond A. Vincent, Plymouth Township, Mich.

[73] Assignee: Draw-Tite Inc., Canton, Mich.

[21] Appl. No.: 291,638

[22] Filed: Aug. 17, 1994

[51] Int. Cl.$^6$ ........................................ B60Q 1/26
[52] U.S. Cl. ............... 315/77; 315/80; 315/86; 340/431; 340/458; 340/475
[58] Field of Search ................... 315/77, 86, 88, 315/92, 93, 82, 83, 80, 131, 133, 135, 136; 340/309.4, 332, 431, 517, 687; 307/10.1, 10.8

[56] References Cited

U.S. PATENT DOCUMENTS

| | | | |
|---|---|---|---|
| 3,864,578 | 2/1975 | Lackey | 307/10 R |
| 4,405,190 | 9/1983 | Schroeder | 339/28 |
| 4,751,431 | 6/1988 | Ducote | 315/77 |
| 4,857,807 | 8/1989 | Hargis | 315/77 |
| 5,030,938 | 7/1991 | Bondzeit | 315/77 X |
| 5,198,798 | 3/1993 | Lietzow et al. | 340/539 |
| 5,241,241 | 8/1993 | Eccleston | 315/77 X |

*Primary Examiner*—Robert J. Pascal
*Assistant Examiner*—Haissa Philogene
*Attorney, Agent, or Firm*—Dykema Gossett

[57] ABSTRACT

An encoder and decoder (multiplexer and demultiplexer) are used to control the rear operating lights (e.g., turn, brake, or running lights) of a trailer towed on the roads behind a tractor vehicle. Voltages powering the tractor vehicle's rear lamps are the inputs to a combinational logic unit with gates (AND, OR, etc.) for interfacing between different lighting systems on the tractor and trailer. The logic unit's outputs are fed to an encoder which converts the parallel outputs to serial data. The data are sent over a single wire to the decoder, mounted on the trailer. The decoder regenerates the parallel signals to control switches (power transistors) driving the trailer lamps with power from the vehicle battery.

19 Claims, 6 Drawing Sheets

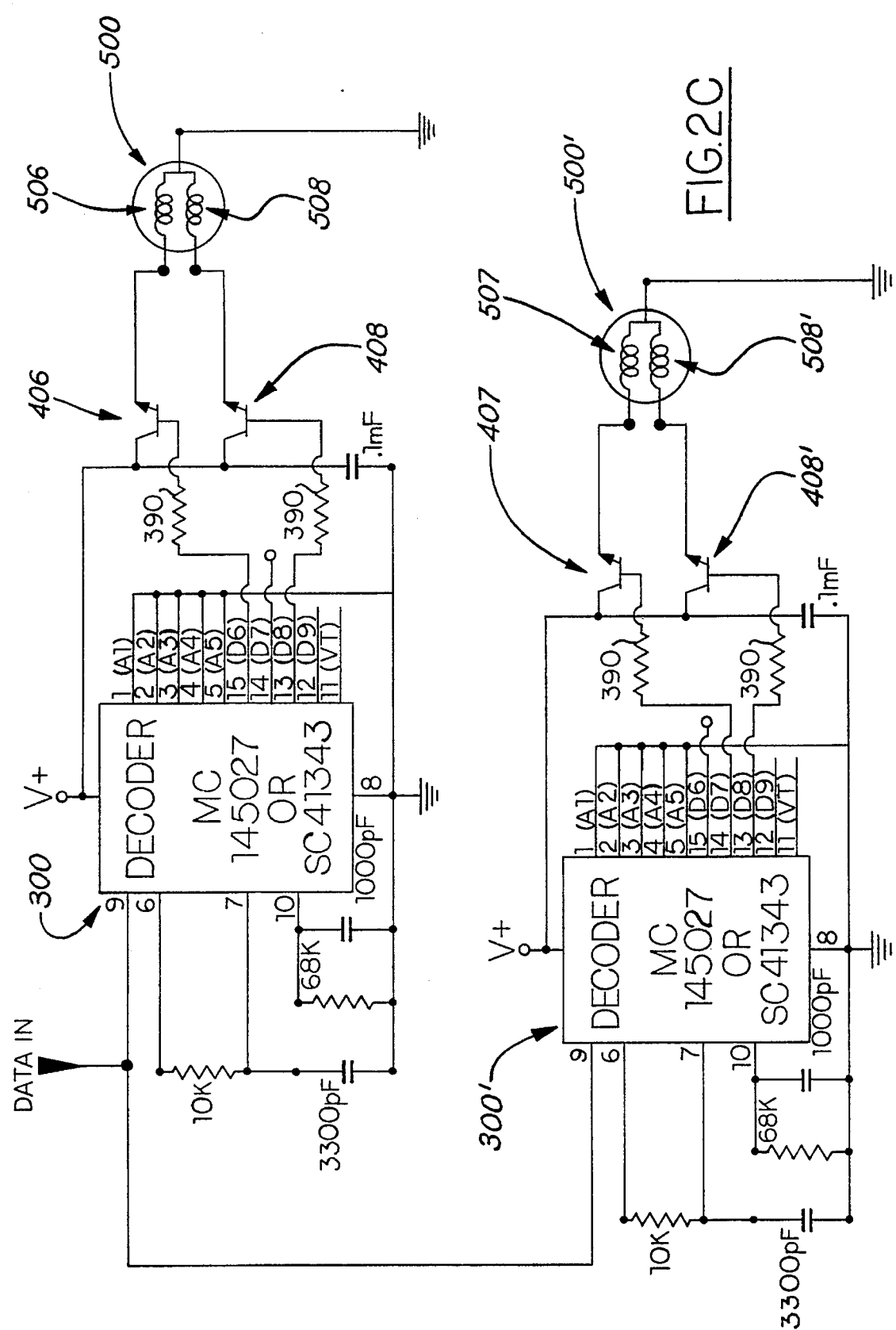

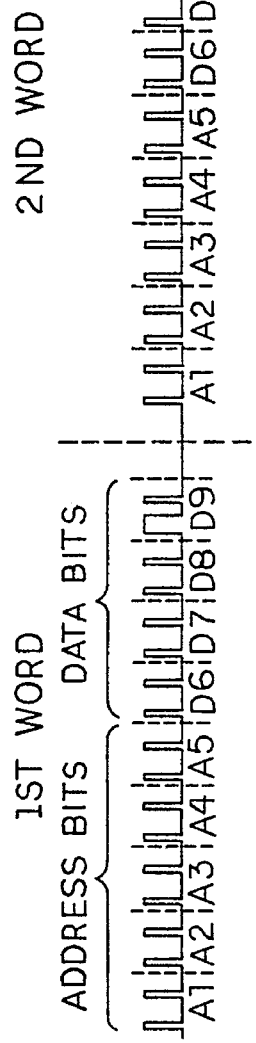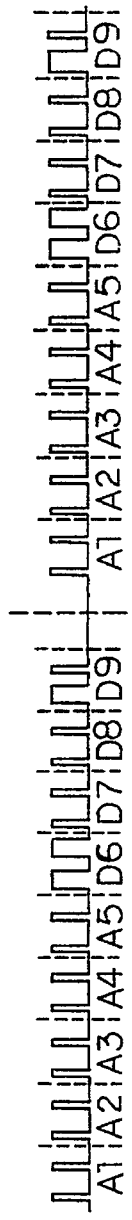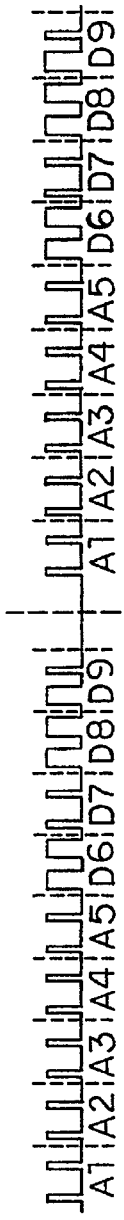
ENCODED DATA STREAM
IC MC145027
FIG.5A — DATA STREAM (ALL BITS LOW)
FIG.5B — LEFT LIGHT ON
FIG.5C — LEFT & RUN LIGHT ON
LEGEND: BIT STATUS
⎍=OPEN  ⎍=HIGH  ⎍=LOW

MULTIPLEXED TRAILER LIGHT SYSTEM

BACKGROUND OF THE INVENTION

1. Field of the Invention

The present invention relates to controlling the operating lights of a towed vehicle (i.e. trailer) according to the operating lights of a towing vehicle.

2. Description of the Related Art

When a towing vehicle (or tractor) tows a trailer, camper, disabled vehicle, or the like (hereinafter collectively referred to as "trailers"), it is necessary to provide and actuate the trailer's lights in such a way that they are slaves and the tractor vehicle lights are masters. Lights commonly provided on trailers include: running lights for night driving; stop or brake lights; and intermittently flashing lights, which serve for turn signals when operated individually or for hazard lights when operated synchronously.

The trailer's lights must duplicate the information of the tractor vehicle's lights. However, the trailer lights need not duplicate the lighting system of the tractor vehicle. Two lighting systems currently exist—the American system and the foreign system.

The foreign system includes three rear lamps on the left and three on the right. One left-right lamp pair is for running lights, the second pair is for stop lights, and the third pair is for turn signals. With three lamps, the three basic lighting functions of run, brake, and turn are separate. The three lamps may be located in separate lamps, but often the running and stop lamps for one side comprise two filaments integrated within a single lamp.

On many American cars and trucks, the brake and turn signals are often combined. That is, the brake and turn lights use the same lamp filament pair of lamps (i.e., one left and one right). When the brake and turn signal are simultaneously activated one light flashes on-off just as it does when only the turn signal is applied on that side, while the corresponding light on the other side of the vehicle stays continuously luminated. The running lights are independent, as with foreign system. Because the turn signal lamps are also used for hazard lights or "four-way flashers", the use of one lamp per side for indicating both turn and brake does not allow the simultaneous hazard and brake lights.

Trailers typically use the American system of having only two lamps per side, often with a signal lamp having two filaments. When the tractor automobile or truck has a different system, the activation of the two light systems, of tractor and trailer, must be coordinated.

One system for interconnecting the lighting system of tractor and trailer vehicles is disclosed by John Schroeder in U.S. Pat. No. 4,405,190. Schroeder's device is an electrical connector into which are plugged cables from both the tractor and trailer. The connector has internal interconnections. This invention has no active or logical devices.

Another consideration in trailer lighting is power drain. If the trailer lights are driven by wires attached to the tractor vehicle's lights, voltage drop caused by the wiring resistance may prevent the trailer lights from being sufficiently illuminated (and excessive current draw can also cause improper signaling of the tractor vehicle light system). These problems can be avoided if the voltages present at the tractor vehicle lights are used as signals, and the current for driving the trailer lamps is supplied through a cable separate from the tractor vehicle's light.

U.S. Pat. No. 4,751,431, issued to James Ducote, teaches the use of electrical relays to drive the trailer lamps. The tractor operating lamp voltages activate the relay coils to close relay switches wired between the main battery and the trailer lamps.

U.S. Pat. No. 5,030,938, issued to Frederick Bondzeit, discloses a trailer lighting adapter.

The adapter uses a driver with XOR (exclusive OR) gates to drive the trailer brake and signal lights. The tractor vehicle's stop light and left-turn signal voltages are fed to the inputs of an exclusive OR gate. The stop light and right-turn signal voltages are fed to the inputs of a second exclusive OR gate. One XOR gate services the trailer's left side, and one the right. Each of the left and the right XOR logic gates consists physically of two CMOS XOR gates that are wired in parallel for the sake of added power capability, redundancy, and avoiding static discharge CMOS latch-up.

The output from either XOR is connected to the base of a power transistor. The transistor acts as a switch connecting the main battery to the trailer brake/turn lamp. When the XOR gate output goes high the respective lamp is powered through the transistor and lights.

The logic of an exclusive OR gate is such that, for either the left or right side trailer lamp, the light is not illuminated when either: both the stop light and the respective signal light of the tractor vehicle are not illuminated (both gate inputs low); or, both the stop light and the respective signal light of the tractor vehicle are illuminated (both gate inputs high). When only one of the tractor vehicle stop and signal lights are on (just one gate input high) the trailer light is illuminated. Thus, when the turn signal actuated while the brake applied, the light flashes on that side.

No other driver is disclosed by Bondzeit.

The Bondzeit device adapts foreign-style tractor vehicle lights to American-style trailer lights. When used to connect an American-style tractor to an American-style trailer, the device's XOR gates are superfluous and it acts only to reduce power drain at the tractor vehicle lamps. Although denoted "universal", the Bondzeit is incapable of adapting an American-style vehicle to a foreign-style trailer.

The Bondzeit invention requires a signal wire from the driver to each independently controllable lamp cluster on the rear of the trailer. The minimum number is three (not counting any common ground connection). Conversely, any additional independent lamp cluster would require additional wires and redesign of the circuit.

SUMMARY OF THE INVENTION

The present invention is an apparatus for controlling the rear operating lamps of a towed trailer according to the rear lamps of a towing tractor vehicle. It uses serial data to control the trailer operating lamps. The invention has a combinational logic unit which has as inputs the tractor vehicle operating lamp voltages and has as outputs a plurality of parallel high-low or on-off signals. The parallel signals are the input to a serial encoder that generates a serial data stream that includes all the information in the signals, but arranges the information sequentially in time. The data is transferred to a decoder that accepts the serial data stream and recreates the plurality of the parallel signals. The signals are used to control lamp-powering switches such as power transistors, that in turn control current to each one of the trailer lamps according to the lighting of the tractor vehicle lamps and the processing of the logic unit.

BRIEF DESCRIPTION OF THE DRAWINGS

FIGS. 2A, 2B, and 2C are a divided schematic view of two embodiments of the present invention.

FIGS. 5A–5C depict the serial data stream present at pin 15 of encoder 200 under certain input conditions.

DETAILED DESCRIPTION OF THE PREFERRED EMBODIMENTS

The following terms as used throughout the remainder of this description are to be defined as follows:

"Decoder" means a device that converts serial data into parallel data, such as a demultiplexer, decoder, or similar device;

"Encoder" means a device that converts parallel data into serial data, such as a multiplexer, encoder, or similar device;

"Lamp" means any light source operating by way of an electric current. A lamp can have a single light source contained therein (e.g. a single filament) or multiple light sources contained therein (e.g. a dual filament); which can be independently illuminated, such as a GE 1157;

"Logic unit" means a device which acts according to a truth table relating the inputs and outputs, where the output signals are a function of the input signals;

"High-low" means signals capable of being in one of two possible states (also referred to as 1-0, on-off, or binary);

"Operating light" or "operating lamp" refer to those lights or lamps normally used or required by law at the nearward portion of road vehicles (either tractor or trailer); such as running lights (continuously illuminated for dark or rain), back-up lights, hazard lights (four-way flashers), and those indicating brake (or stop), left turn, and right turn;

"Parallel" has the meaning, common in electronics, of multiple signals existing simultaneously in time;

"Serial" has the meaning, common in electronics, of multiple signals existing sequentially in time; and "Tractor" and "Trailer" refer to any road vehicles which tow and are towed, respectively.

The present invention is an apparatus and method for activating trailer lights according to voltages present at the operating lamps of a tractor vehicle.

Figure 1:
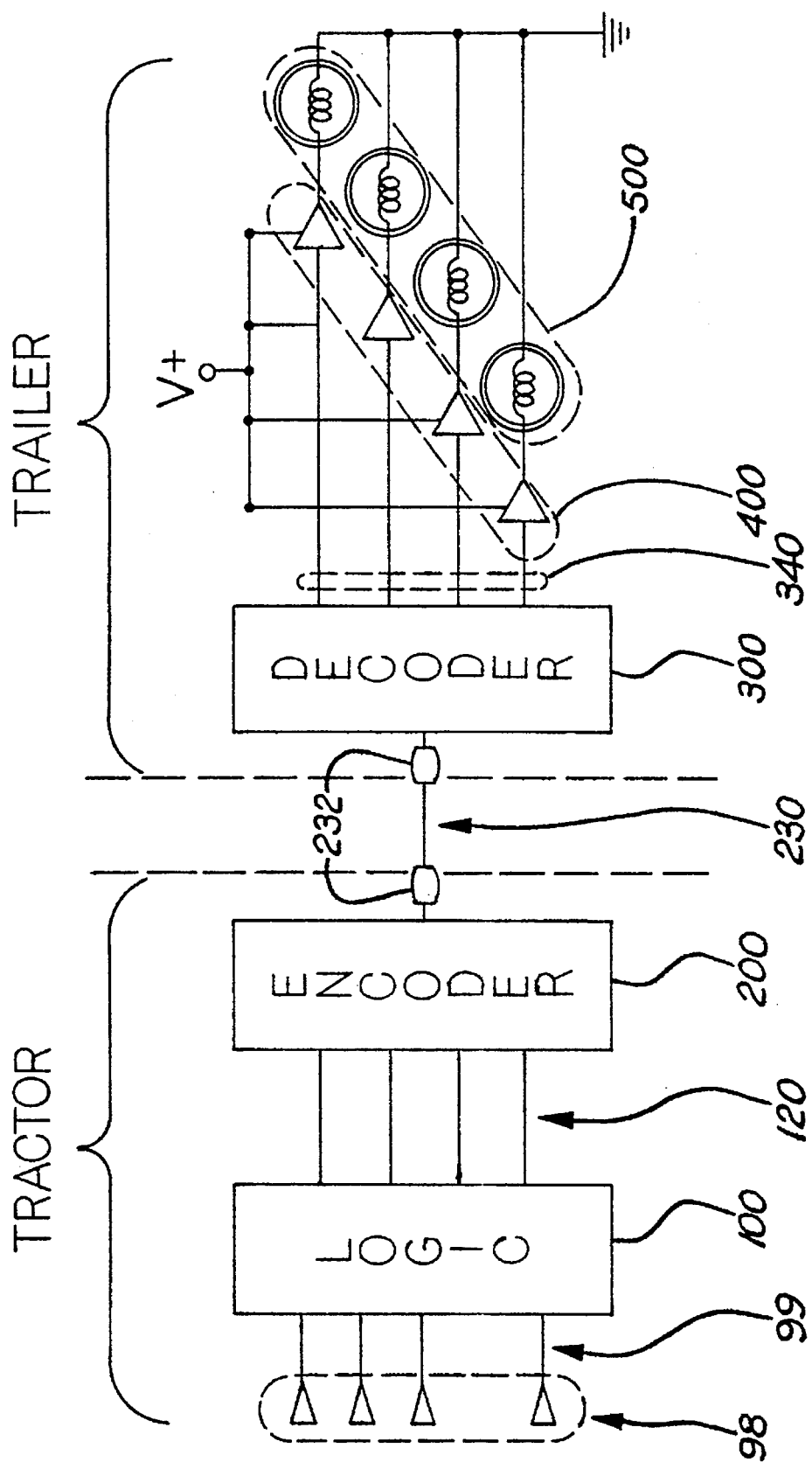
FIG. 1 is a block diagram of the present invention.

A block diagram of the invention is shown in FIG. 1. Connectors 98 are connected into the electrical system of the tractor vehicle at points where actuating voltages for the operating lamps are present. Usually, connections are provided at the running lamps, the brake lamps, the left turn lamp, and the right turn lamp. The tractor vehicle lamp voltages are conducted by wires 99 to a logic unit 100.

The logic unit 100 acts according to a truth table. Each permutation of inputs causes a specific output. The number of possible outputs is $2^N$, where N is the number of inputs. The input tractor vehicle lamp voltage can be in one of two possible states—+12 volts or 0 volts. These states are also known as high and low or 1 and 0. According to the logic convention adopted, the "high" can be either +12 or 0.

The logic unit 100 will ordinarily be a circuit composed of logical gates, such as AND, NOT, OR, XOR (exclusive OR), NAND, and NOR gates. The logic unit 100 could also include a microprocessor programmed for combinational logic. The gates preferably can interface with conventional vehicle electrical systems (12–14 volts) for both operating power and input signals. The gates may be CMOS devices, which accept between +3 and +18 volts and have low power drain.

The circuit or program of the logic unit 100 is designed to achieve the desired truth table, and the truth table is designed according to the actuation desired at the trailer lamps.

For example, if American-style tractor lamps control American-style trailer lamps, the logic is trivial: a one-to-one correspondence exists between tractor and trailer lights on the same side (left or right). A trivial truth table for a brake and turn (B/T) tractor vehicle light and the corresponding one trailer lamp (X) would be:

| B/T | X |
|---|---|
| 0 | 0 |
| 1 | 1 |

A truth table for foreign-style separate brake (B) and turn (T) tractor vehicle light and the one rear trailer lamp (X) on the same side would be:

| B | T | X |
|---|---|---|
| 0 | 0 | 0 |
| 0 | 1 | 1 |
| 1 | 0 | 1 |
| 1 | 1 | 0 |

This truth table can be achieved by a logic unit 100 having a single XOR gate for either side.

A truth table for American-style combined brake and turn lights actuating foreign-style trailer lights would take into account both sides of the vehicle. For example, the logic for the left tractor vehicle brake light (LB) and the right tractor vehicle turn light (RT) for actuating two left-hand trailer lamps for braking (XB) and turning (XT) would be

| LB | RT | XB | XT |
|---|---|---|---|
| 0 | 0 | 0 | 0 |
| 0 | 1 | 0 | 0 |
| 1 | 0 | 1 | 0 |
| 1 | 1 | 1 | 0 | with a similar table for the right-hand trailer lamps.

Any truth table can be achieved with logic gates, or alternative means such as a microprocessor.

Since trailers are often long, and wire and connectors are expensive (and connectors are prone to corrosion), the number of signal wires and connectors should be minimized. The ideal is achieved when only one signal wire is required to control all the trailer lamps, regardless of how many. This is impossible with the parallel-signal methods used by prior-art inventions because in the prior art, each trailer lamp or lamp set requires a dedicated wire. The present invention, in contrast, uses the serial data method.

Referring again to FIG. 1, outputs from the logic unit 100 travel over wires 120 to an encoder 200. The encoder 200 converts the various high and low signals on the wires 120 into a digital data word. The data word, carrying all the parallel information coming out of the logic unit 100 over the wires 120, is sent over a single serial data transfer wire 230 to a decoder 300.

The decoder 300 reconverts the serial data word back into the same parallel signals that were received by the encoder over wires 120. The regenerated parallel signals are sent over wires 340 to electronic switches 400. The switches 400 are preferably solid state devices such as high-power FET's or NPN transistors. When the switches 400 are closed, current flows from V+ (the vehicle electric power supply) to trailer lamps 500. V+ is preferably supplied by a separate, fused cable from the vehicle battery to avoid any substantial voltage drop.

The encoder 200 is preferably located on the tractor vehicle, and the decoder 300 on the trailer. Serial data wire 230 may include connectors 232 that can be disconnected when the trailer is unhooked, and which can be used to divide wire 230 for distribution of the data word to multiple decoders. The decoder 300, wires 340, and switches 400 may be duplicated as desired. For example, it may be desirable to have one decoder for the left bank of trailer lamps and a second for the right.

Figure 2A:
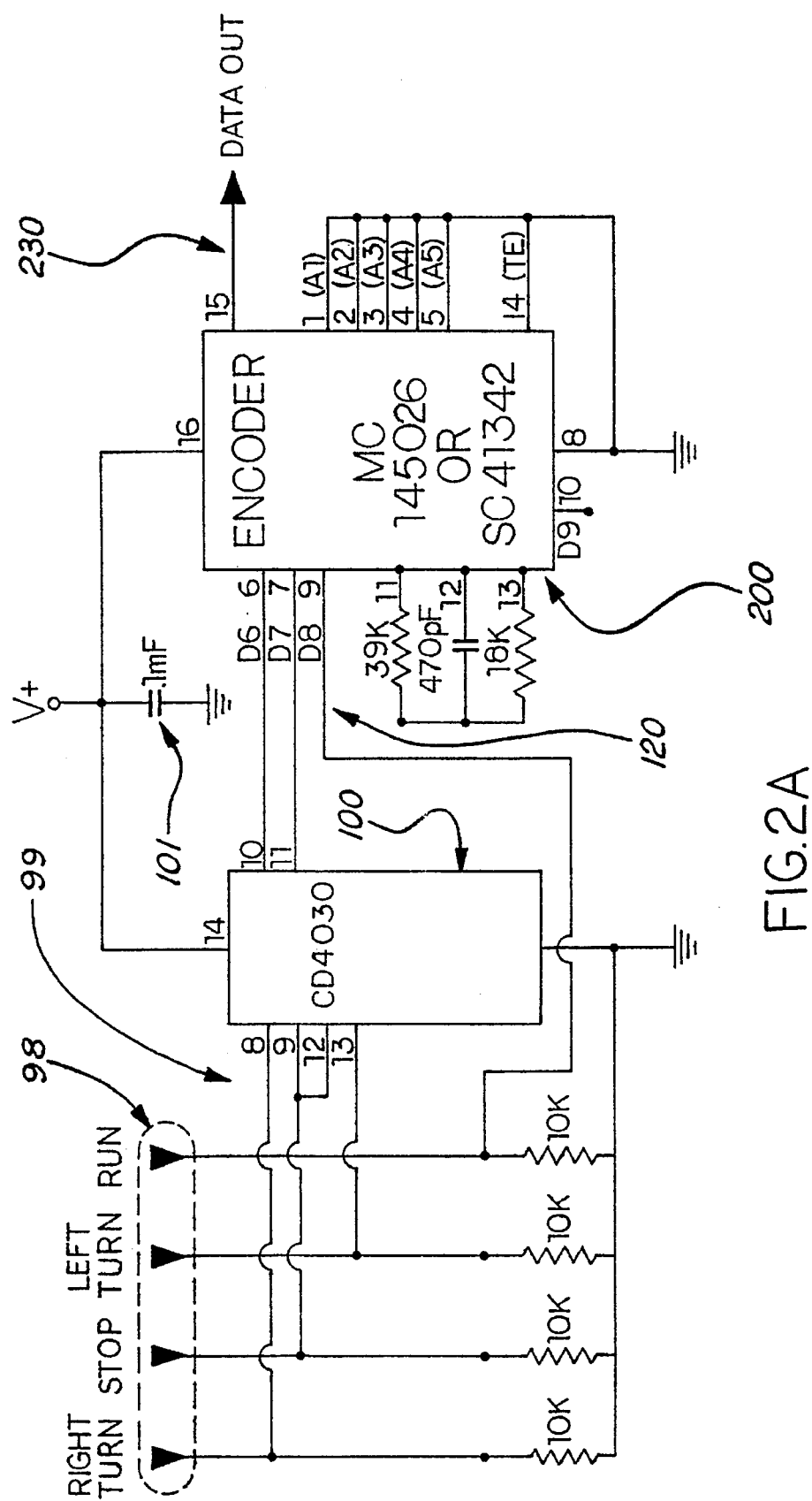
Figure 2B:
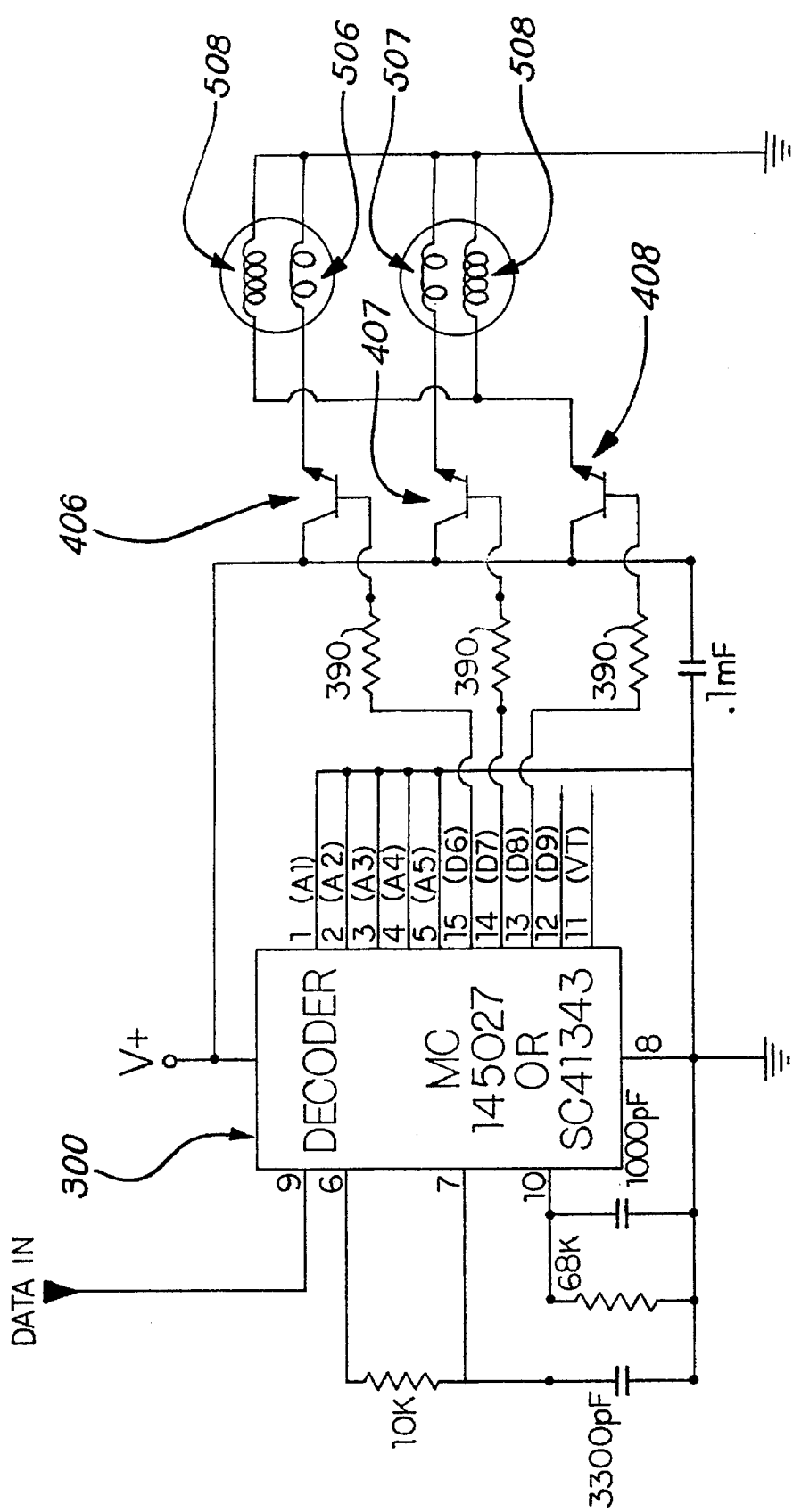

Preferred embodiments of the present invention are depicted in FIGS. 2A, 2B, and 2C. FIG. 2A shows a portion of the invention as far as the transfer wire 230; FIGS. 2B and 2C depict the remaining portion of the invention. The particular embodiments illustrated are intended for connecting to American-style trailers.

The logic unit 100 is a commercial quad XOR gate package. Pins 8 and 9, the inputs to one gate, are connected to the brake lamp and right turn lamp of the tractor vehicle; pin 11 is the output. Analogously, the brake lamp and left turn lamp are connected to pins 12 and 13, the inputs to another gate whose output is at pin 10.

The preferred embodiment uses a commercial encoder-decoder pair, the Motorola MC145026 (encoder 200) and Motorola MC145027 (decoder 300). An alternate pair is the SC41342 and the SC41343.

The encoder 200 and decoder 300 are conventional devices for inter-converting parallel and serial data, and may be of any suitable type. "Encoder" implies that data is handled directly without a separate address. The preferred devices nominally use part of the data for addresses. The present invention's devices 200 and 300 may be called "encoders" or "multiplexers".

The encoder 200 has nine data pins (1–9) for inputting signals. Five signals are labelled A (address) pins, and are accepted at the corresponding pins (i.e., signal A3 goes to pin 3). The address pins are superfluous in the present invention and are grounded. Pins 6, 7, 9, 10 accept data signals denoted as D6, D7, D8, and D9. Signal D6 goes to pin 6 and D7 goes to pin 7. However, signal D8 goes to pin 9 and D9 goes to pin 10.

Each of the pins 6, 7, and 9 is connected to one lamp or lamp set. The running light lamps are connected to D8 (pin 9). D6 (pin 6) is connected to the output from the XOR gate whose inputs are the brake and left turn lamps. D7 (pin 7) is connected to the output from the XOR gate whose inputs are the brake and right turn lamps. Appropriate connections are also made to V+ (the vehicle battery) at pin 16 and to ground at pin 8. The capacitors and resistors on pins 11, 12, and 13 control the clock rate.

The data words sent by the encoder 200 from pin 15 over line 200 are nine bits long, with the first five bits corresponding to A1 through A5, and the next four corresponding to D6 through D9. Because the address pins are grounded, each word has the same address, 00000. D6, D7, and D8 are 1 or 0 (high or low) depending upon whether voltage is present or not. Since pin 10 on the encoder 200 is connected to neither zero nor +12 volts, D9 is "open". If desired, D9 could be used for an additional trailer lamp, e.g., backup lights. Also, D9 could be used to signal a brake event. This in turn could trigger the application of electric brakes on the trailer. The encoded brake signal could be derived from the brake pedal switch. Additionally, the driver could be furnished with a manual switch so that the trailer brakes could be activated independent of the tractor vehicle brakes.

The bit states of 0, 1, and open are coded according to a double-pulse protocol. Two short pulses make the bit 0 or low, two long pulses make the bit 1 or high, and a long and a short make the bit open (or /). If the left turn signal lamp of the tractor vehicle is lit, the data word sent by the encoder 200 is 00000100/. If the left turn and the running lights are both on, the word is 00000101/.

Because pin 14 (TE, Transmit Enable) is grounded the encoder 200 will continually send words describing the status of the tractor vehicle lamps. The data words are sent in pairs for redundancy; the decoder 300 checks that the data in word pairs are identical.

As was explained earlier, pins 14 and 16 from chips 100, 200, respectively can be directly powered from V+ 103; however in a preferred embodiment, V+ (tractor battery voltage) is not directly used but rather diodes 97 provides a current path for charging capacitor 101. When the last off or low signal is received by the encoder, capacitor 101 stores sufficient power (due to the "high" state of at least one line of 98) to allow encoder 230 to send multiple pulse trains of low state to the decoder which latches the signal and waits for the next set of valid pulse trains. Thus a separate power line is not necessary for powering chips 100, 230.

A first embodiment of the trailer portion of the invention is shown in FIG. 2B. Data words are received at pin 9 of the decoder 300. The decoder outputs D6, D7, DS, and D9 (on pin numbers 15, 14, 13, and 12 respectively) mimic the high or low inputs D6 through D9 at the encoder 200.

D6 at pin 15 of the decoder 300 is connected to the base of power transistor 406, which may be an ECG253 type. When D6 has value 0 or low (is at 0 volts), then the transistor 406 does not conduct. When D7 has value 1 or high (+12 volts), then the base is saturated and the transistor conducts, lighting filament 506, the left-hand brake/turn lamp. Filament 506 is housed in a left-hand trailer bulb 500 along with filament 508, the running light lamp. Filament 508 is powered when D8 goes high, causing transistor 408 to conduct. Signal D7 acting through transistor 407 controls lamp filament 507, the right-hand brake/turn lamp, which is housed in the right-hand bulb 500 with a second running light lamp filament 508. Both filaments 508 are powered from transistor 408.

In the second embodiment, shown in FIG. 2C, the transfer wire 230 is divided and two decoders 300, 300' are provided. As in the first embodiment, D6 controls the left-hand brake/turn lamp and D8 controls the left-side running lamp; however, the D7 pin is open. At the right-hand decoder 300' D7 is connected to the transistor 407 to power filament 507 but D6 is left open. D8 controls the running lamp filament, as on the left side. This embodiment requires a total of four switching transistors.

In the second embodiment only a subset of the signals are used at either of the two decoders: D6 and D8 are used on the left-hand decoder, and D7 and D8 are used on the right-hand decoder. Each decoder, however, accepts entire data words.

Each trailer lamp is actuated according to a respective one of the plurality of decoder signals, but more than one decoder output may be connected to a lamp. Trivially, two or more outputs may all go high or low together; or, one output may override another connected to the same transistor.

In the preferred embodiments of FIGS. 2A–2C the extra data channel D9 allows for expansion. Extra trailer brake lights, controlled by a central third auto brake light (which is independent of the turn signals) would be one possible expansion. Back-up lights would be another. If more than one extra channel were desired, the five un-used address bits could be used for data as well.

The preferred encoder-decoder pairs are adaptable for infrared data transmission.

An encoder will typically include an oscillator and a sampling circuit (for example, a multiplexer with rotating select to sequentially choose among the input signals). The oscillator is used as a clock. The inputs are sampled at regular time intervals as determined by the clock or a divider attached to the clock. A decoder will typically include a demultiplexer and a latch, or equivalent circuits, with a clock slaved to or synchronized with the clock of the encoder.

Figure 3:
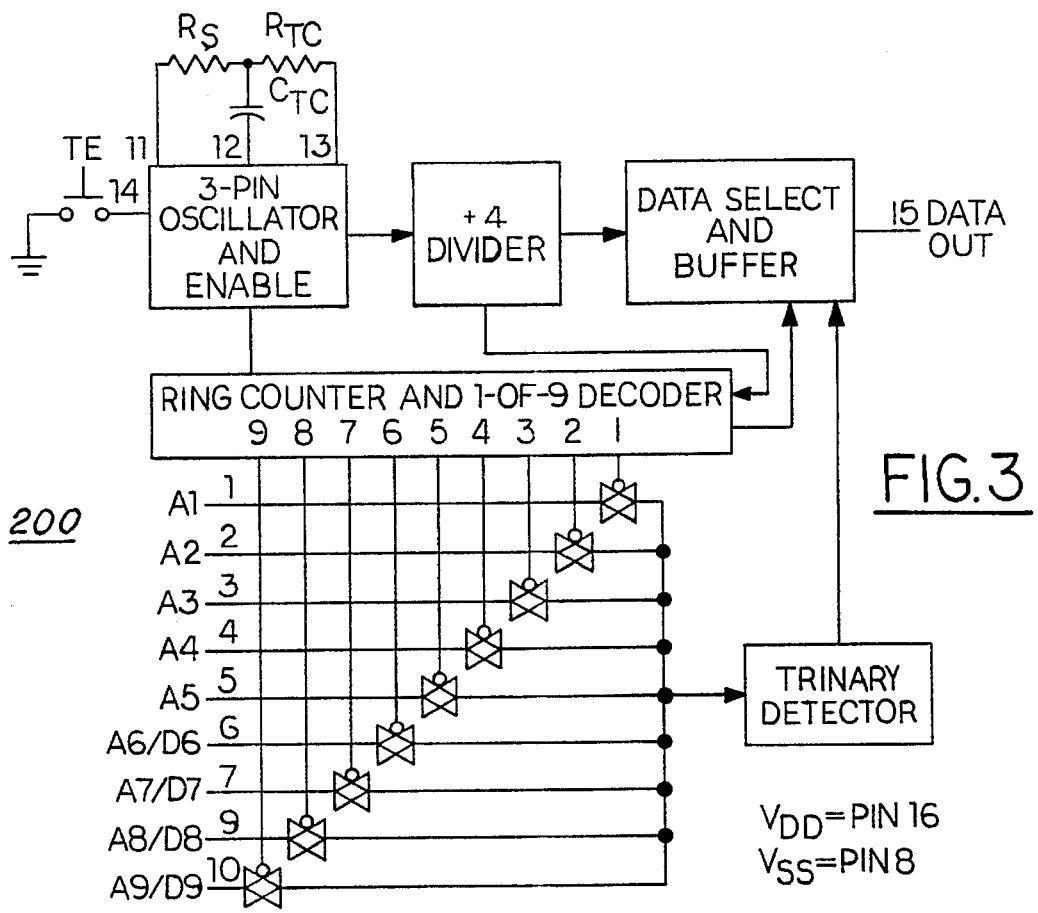
FIG. 3 is a block diagram of the preferred encoder.
Figure 4:
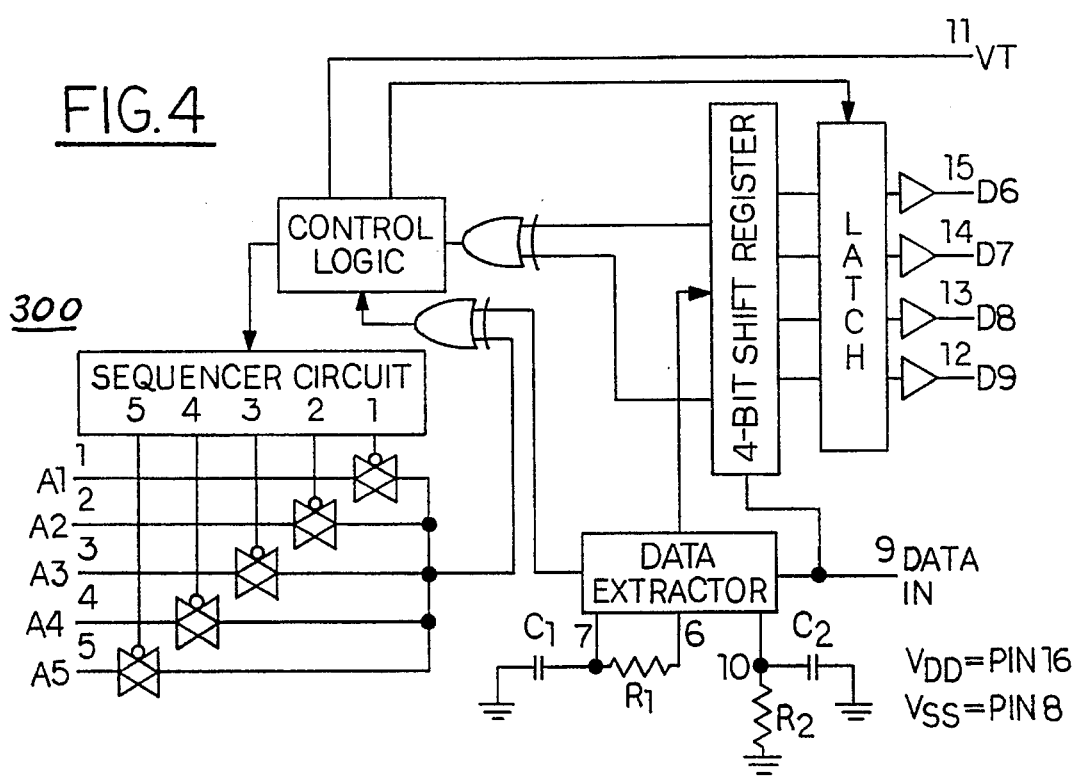
FIG. 4 is a block diagram of the preferred decoder in a first embodiment.

FIG. 3 is a block diagram of the Motorola MC145026 (encoder 200). FIG. 4 is a block diagram of the Motorola MC145027 (decoder 300). The MC145027 control logic keeps track of incoming data words and checks that each of the double words is identical.

FIG. 5A shows the serial bit stream from pin 15 of encoder 200 when D6, D7, and D8 are low. FIG. 5B shows the serial bit stream emanating from encoder 200 when D6 is high and D7 and D8 are low (i.e. turn signal on). FIG. 5C depicts the serial data stream present at pin 15 of encoder 200 with D6 and D8 high and D7 low (i.e. running lights on and left turn signal on).

In summary, the present invention uses single-channel serial data transfer rather than parallel channels. It requires only one control wire from the tractor to the trailer, rather than three or more, to reduce the cost of wiring and connectors. The invention allows for expansion to additional light sets or alternative logic between the tractor vehicle lights and the trailer lights.

The foregoing detailed description shows that the preferred embodiments of the present invention are well-suited to fulfill the objects of the invention. It is recognized that those skilled in the art may make various modifications or additions to the preferred embodiments chosen here to illustrate the present invention without departing from the spirit of the present invention. Accordingly, it is to be understood that the subject matter sought to be afforded protected hereby should be deemed to extend to the subject matter defined in the appended claims, including all fair equivalents thereof.

I claim:

1. An apparatus for actuating a plurality of operating lamps of a towed vehicle according to the operating lights of a towing vehicle, the apparatus comprising:

a logic unit having as inputs towing vehicle operating lamp voltages and having as outputs a parallel plurality of high-low signals, and an encoder responsive to the parallel plurality of high-low signals for generating an encoded serial data stream from said signals, wherein the logic unit and the encoder are mounted on the towing vehicle;

a first decoder responsive to the encoded serial data stream for regenerating the plurality of high-low signals from said stream, and a lamp powering means for lighting each one of the plurality of rear operating lamps of the towed vehicle according to a respective one of the plurality of high-low signals, wherein the first decoder and the lamp powering means are mounted on the towed vehicle; and a data transfer means for transferring the encoded serial data stream from the towing vehicle to the towed vehicle.

2. The apparatus according to claim 1, wherein the lamp powering means further comprises a switching device switched by at least one of the plurality of high-low signals, the switching device acting to selectively connect and disconnect a vehicle electric power source to a one of the plurality of rear operating lamps.

3. The apparatus according to claim 2, wherein the switching device is a semiconductor device.

4. The apparatus according to claim 3, wherein the semiconductor device is an NPN transistor having a base for accepting the one of the plurality of high-low signals.

5. The apparatus according to claim 1, wherein the data transfer means is single-channel.

6. The apparatus according to claim 5, wherein the data transfer means further comprises a transfer wire.

7. The apparatus according to claim 6, wherein the transfer wire includes disconnection means.

8. The apparatus according to claim 1, wherein the logic unit further comprises gates selected from the group consisting of AND, OR, XOR, NOT, NAND, and NOR.

9. The apparatus according to claim 8, wherein the logic unit further includes a pair of XOR gates.

10. The apparatus according to claim 1, wherein the towing vehicle operating lamp voltages include a running lamp voltage, a right-turn lamp voltage, a left-turn lamp voltage, and a brake lamp voltage.

11. The apparatus according to claim 1, wherein the parallel plurality of high-low signals include a running light signal, a combined left-turn light and brake light signal, and a combined right-turn light and brake light signal.

12. The apparatus according to claim 1, wherein the encoder includes a multiplexer.

13. The apparatus according to claim 1, wherein the encoder includes a clock.

14. The apparatus according to claim 1, wherein the decoder further comprises a demultiplexer.

15. The apparatus according to claim 1, wherein the decoder further comprises a shift register and a latch.

16. The apparatus according to claim 1, further comprising a second decoder mounted on the towed vehicle and responsive to the encoded serial data stream for regenerating the plurality of high-low signals from the stream.

17. For actuating a plurality of operating lamps of a towed vehicle according to the operating lights of a towing vehicle, an apparatus comprising:

a logic unit controlled by towing vehicle operating lamp voltages for generating a parallel plurality of high-low signals from said voltages, and an encoder responsive to said parallel plurality of high-low signals for generating an encoded serial data stream from said signals, said logic unit and said encoder being mounted on said towing vehicle;

a plurality of decoders responsive to said encoded serial data stream for regenerating respective signal subsets of said plurality of high-low signals from said stream, and a lamp powering means for lighting each one of said plurality of rear operating lamps of the towed vehicle according to a respective one of the plurality of high-low signals, said plurality of decoders and said lamp powering means being mounted on said towed vehicle; and a data transfer means for transferring said encoded serial data stream from said towing vehicle to said towed vehicle.

18. The apparatus according to claim 17, wherein:

the plurality of decoders includes a left-hand decoder and a right-hand decoder;

the left-hand decoder regenerating a left-hand subset of the plurality of high-low signals; and the right-hand decoder regenerating a right-hand subset of the plurality of high-low signals.

19. A method of controlling rear operating lamps of a towed trailer vehicle according to rear operating lamps of a towing tractor vehicle, said method comprising the steps of:

providing voltages controlling said rear operating lamps on said towing tractor vehicle;

generating a first parallel plurality of low-high signals from said voltages;

transforming said first parallel plurality of low-high signals into a serial data stream;

transferring said serial data stream from said towing tractor vehicle to said towed trailer vehicle;

retransforming said serial data stream into a second parallel plurality of low-high signals, said retransforming being performed on said towed trailer vehicle, said second parallel plurality of low-high signals being a replica of said first parallel plurality of low-high signals; and powering each one of said rear operating lamps of said towed trailer vehicle according to a respective one of said retransformed plurality of signals.

* * * * *